United States Patent
Chen et al.

(10) Patent No.: US 12,492,623 B2
(45) Date of Patent: Dec. 9, 2025

(54) METHOD AND SYSTEM FOR OPTIMIZATION OF DEVELOPMENT BY CARBON DIOXIDE INJECTION BASED ON INCOMPLETE MISCIBILITY CHARACTERISTICS

(71) Applicant: China University of Petroleum (Beijing), Beijing (CN)

(72) Inventors: Hao Chen, Beijing (CN); Xiliang Liu, Beijing (CN); Borui Li, Beijing (CN); Weiming Cheng, Beijing (CN); Qing Chang, Beijing (CN); Ruwei Zhang, Beijing (CN); Zhizhen Lin, Beijing (CN); Mingsheng Zuo, Beijing (CN); Baoxi Yang, Beijing (CN); Xinyu Qi, Beijing (CN); Feng Luo, Beijing (CN); Linxi Yang, Beijing (CN); Wen Liu, Beijing (CN); Pengbo Li, Beijing (CN)

(73) Assignee: China University of Petroleum (Beijing) (CN)

( * ) Notice: Subject to any disclaimer, the term of this patent is extended or adjusted under 35 U.S.C. 154(b) by 0 days.

(21) Appl. No.: 19/067,674

(22) Filed: Feb. 28, 2025

(65) Prior Publication Data
US 2025/0297539 A1 Sep. 25, 2025

(30) Foreign Application Priority Data

Mar. 25, 2024 (CN) .......................... 202410342868.3

(51) Int. Cl.
*E21B 43/16* (2006.01)
*E21B 43/30* (2006.01)
(Continued)

(52) U.S. Cl.
CPC ............ *E21B 43/164* (2013.01); *E21B 43/30* (2013.01); *E21B 43/25* (2013.01); *E21B 2200/20* (2020.05); *G01N 33/2841* (2013.01); *G06F 30/20* (2020.01)

(58) Field of Classification Search
USPC ........................................................... 702/6
See application file for complete search history.

(56) References Cited

U.S. PATENT DOCUMENTS

| | | | | |
|---|---|---|---|---|
| 4,467,868 A | * | 8/1984 | Adamache | ............. C09K 8/594 166/402 |
| 4,513,821 A | * | 4/1985 | Shu | ........................ E21B 36/001 166/402 |

(Continued)

FOREIGN PATENT DOCUMENTS

| | | | |
|---|---|---|---|
| CN | 107621350 A | | 1/2018 |
| CN | 108460203 A | * | 8/2018 |

(Continued)

OTHER PUBLICATIONS

First Office Action and English Translation issued for Chinese Patent Application No. 202410342868.3 dated Jul. 17, 2024, 9 pg.

(Continued)

*Primary Examiner* — Paul D Lee
(74) *Attorney, Agent, or Firm* — FOLEY & LARDNER LLP

(57) ABSTRACT

A method and a system for optimization of development by carbon dioxide injection based on incomplete miscibility characteristics are provided, where the method includes following steps: building a three-dimensional reservoir model based on laboratory experiments and reservoir values, where the three-dimensional reservoir model includes: a fluid model and a reservoir model; based on the three-dimensional reservoir model, obtaining incomplete miscibility characteristics of reservoir development by carbon (Continued)

dioxide injection; and completing whole life cycle optimization development of carbon dioxide injection based on the incomplete miscibility characteristics.

6 Claims, 32 Drawing Sheets

(51) Int. Cl.
   *E21B 43/25* (2006.01)
   *G01N 33/28* (2006.01)
   *G06F 30/20* (2020.01)

(56) References Cited

U.S. PATENT DOCUMENTS

| | | | | |
|---|---|---|---|---|
| 2011/0198081 | A1* | 8/2011 | Pone | E21B 43/164 |
| | | | | 166/270.1 |
| 2015/0060057 | A1* | 3/2015 | Hawthorne | E21B 47/06 |
| | | | | 166/250.01 |
| 2016/0102538 | A1* | 4/2016 | Murrell | C09K 8/594 |
| | | | | 166/308.2 |
| 2020/0333316 | A1 | 10/2020 | Huang et al. | |
| 2021/0163814 | A1* | 6/2021 | Pu | E21B 43/26 |
| 2022/0042404 | A1* | 2/2022 | AlKhateeb | E21B 43/20 |
| 2024/0183256 | A1* | 6/2024 | AlYousif | E21B 7/046 |
| 2025/0034995 | A1* | 1/2025 | Song | E21B 47/07 |

FOREIGN PATENT DOCUMENTS

| | | |
|---|---|---|
| CN | 110259441 A | 9/2019 |
| CN | 112651121 A | 4/2021 |
| CN | 117634125 A | 3/2024 |

OTHER PUBLICATIONS

Notification to Grant Patent Right for Invention and English Translation issued for Chinese Patent Application No. 202410342868.3 dated Sep. 18, 2024, 3 pg.

Search Report and English Translation for Chinese Patent Application No. 202410342868.3 dated Jul. 16, 2024, 5 pg.

* cited by examiner

METHOD AND SYSTEM FOR OPTIMIZATION OF DEVELOPMENT BY CARBON DIOXIDE INJECTION BASED ON INCOMPLETE MISCIBILITY CHARACTERISTICS

CROSS-REFERENCE TO RELATED APPLICATIONS

This application claims priority to Chinese Patent Application No. 202410342868.3, filed on Mar. 25, 2024, the contents of which are hereby incorporated by reference.

TECHNICAL FIELD

The present disclosure relates to the technical field of carbon dioxide flooding, and in particular to a method and a system for optimization of development by carbon dioxide injection based on incomplete miscibility characteristics.

BACKGROUND

With the continuous development of carbon dioxide flooding technology, carbon dioxide flooding has been widely used in low permeability reservoirs. At present, carbon dioxide flooding has become one of the main flooding technologies in low permeability oilfields. As an efficient flooding reagent, carbon dioxide has high solubility and good extraction function. Compared with water medium, carbon dioxide has the advantages of low viscosity, strong extraction ability and strong injection ability, which may not only significantly reduce the viscosity of crude oil, but also reduce the interfacial tension, greatly improving the recovery effect of crude oil, thus enhancing the recovery.

At present, due to the relatively small pores, narrow throats and poor connectivity between the pores in the development of low permeability reservoirs by injecting carbon dioxide, there is a phenomenon of pressure funnel between injection-production wells. The pressure decreases from injection well to production wells, and the pressure distribution is widespread, making it difficult to realize the overall miscibility of the reservoir. Therefore, it is necessary to to conduct whole cycle injection-production optimization based on the incomplete miscible displacement characteristics of carbon dioxide.

The flooding effect of carbon dioxide injection has a great relationship with the injection-production parameters, so it is particularly important to choose the appropriate development mode and injection-production system. Common development methods include continuous gas injection, carbon dioxide huff and puff, and carbon dioxide water alternating gas, etc. Conventional development adopts continuous gas injection, but the development effect is not ideal, and carbon dioxide water alternating gas may meet the technical and economic requirements of tertiary oil recovery. Common well patterns of carbon dioxide drive include five-spot well pattern, inverted seven-spot well pattern, inverted nine-spot well pattern, etc. The five-spot well pattern has a high degree of control over sand bodies and a high injection-production intensity. It is difficult to adjust the injection-production well pattern in the later stage of the inverted seven-spot well pattern. The inverted nine-spot well pattern is uneven in injection-production well spacing, which is easy to cause gas channeling prematurely.

Water alternating gas (WAG) is a mature technology for enhancing recovery, which combines the effects of two conventional oil recovery technologies-water injection and gas injection. In practice, optimizing gas injection and water injection slugs and alternating cycle may help to improve the effective period of oil increase. Generally speaking, the optimization of whole cycle injection-production of reservoir may help to make oilfield development more efficient and sustainable, while reducing the impact on the environment. The research significance of parameter optimization of carbon dioxide water alternating gas lies in that the optimized flooding parameters may improve the flooding efficiency of carbon dioxide in low permeability reservoirs and realize the emission reduction and storage of carbon dioxide in the atmosphere. The working system of carbon dioxide water alternating gas includes the gas-water slug ratio, slug size, etc. To optimize the water alternating gas injection, it is necessary to balance the effective volume of gas and water required for injection into the pore system, that is, slug ratio. Too much injected water will lead to poor microscopic scanning efficiency, or too much injected gas will reduce the stability and macroscopic scanning effect.

Different injection-production optimization methods have their own advantages and disadvantages, but the existing injection-production optimization models do not consider the typical incomplete miscible displacement characteristics of low permeability reservoirs and the comprehensive optimization of development methods, well patterns and well spacing, and injection-production systems, and there are errors in recovery evaluation, gas breakthrough time prediction, and oil-gas migration laws, which are not conducive to the development plan planning under the conditions of real low permeability reservoirs and bring difficulties to the strategy formulation of actual development of low permeability reservoirs.

SUMMARY

In order to solve the technical problems in the prior art, based on the incomplete miscible displacement characteristics of carbon dioxide, combined with mathematical methods and numerical simulations, the present disclosure has carried out the whole cycle injection-production optimization of low permeability reservoirs including the optimization of injection mode, well pattern spacing and injection-production system, and has carried out the injection-production optimization from the reservoir engineering method and the front distribution law, and has established a reasonable injection-production optimization method for the whole life cycle of reservoir development by carbon dioxide injection for the first time. The method provides an important basis for the economy and rationality for designing the scheme of reservoir development by carbon dioxide injection.

In order to achieve the above objectives, the present disclosure provides an optimization method for development by carbon dioxide injection based on incomplete miscibility characteristics, including following steps:
  building a three-dimensional reservoir model based on laboratory experiments and reservoir values, where the three-dimensional reservoir model includes: a fluid model and a reservoir model;
  based on the three-dimensional reservoir model, obtaining incomplete miscibility characteristics of reservoir development by carbon dioxide injection; and
  completing whole life cycle optimization development of carbon dioxide injection based on the incomplete miscibility characteristics.

Optionally, the method for building the fluid model includes:

based on the laboratory experiments, analyzing and obtaining fluid components of formation crude oil;

defining adjustable variables based on the fluid components of the formation crude oil, where the adjustable variables include component interaction coefficient, molar mass of $C_{30+}$ and crude oil viscosity; and fitting experimental data of numerical simulation and physical simulation based on the adjustable variables, and outputting the fluid model when a simulation accuracy is greater than 95%.

Optionally, the reservoir model is built based on reservoir numerical simulation, and reservoir parameters are set after the reservoir model is built; and the reservoir parameters include: reservoir depth, temperature, reservoir pressure, reservoir porosity, reservoir permeability, reservoir oil saturation, reservoir temperature gradient, reservoir pressure coefficient and reservoir saturation pressure.

Optionally, a method for obtaining the incomplete miscible characteristics includes:

obtaining a simulation result diagram based on the three-dimensional reservoir model;

calculating key characterization parameters based on the simulation result diagram; and based on the key characterization parameters, obtaining the incomplete miscibility characteristics.

Optionally, a method for completing the whole life cycle optimization development of carbon dioxide injection includes: injection mode optimization, well pattern spacing optimization and water alternating gas system optimization.

The present disclosure also provides an optimization system for development by carbon dioxide injection based on incomplete miscible characteristics, where the system is used for realizing the above method and includes a building module, a calculation module and an optimization module;

the building module is used for building the three-dimensional reservoir model based on the laboratory experiments and the oil reservoir values, where the three-dimensional reservoir model includes: the fluid model and the reservoir model;

the calculation module is used for obtaining the incomplete miscibility characteristics of the reservoir development by carbon dioxide injection based on the three-dimensional reservoir model; and the optimization module is used for completing the whole life cycle optimization development of carbon dioxide injection based on the incomplete miscibility characteristics.

Optionally, a workflow of the building module includes:

based on the laboratory experiments, analyzing and obtaining fluid components of formation crude oil;

defining adjustable variables based on the fluid components of the formation crude oil, where the adjustable variables include component interaction coefficient, molar mass of $C_{30+}$ and crude oil viscosity; and fitting experimental data of numerical simulation and physical simulation based on the adjustable variables, and outputting the fluid model when a simulation accuracy is greater than 95%.

Optionally, a workflow of the building module also includes: building the reservoir model based on reservoir numerical simulation, and setting reservoir parameters after the reservoir model is built, where the reservoir parameters include: reservoir depth, temperature, reservoir pressure, reservoir porosity, reservoir permeability, reservoir oil saturation, reservoir temperature gradient, reservoir pressure coefficient and reservoir saturation pressure.

Compared with the prior art, the present disclosure has the following beneficial effects.

The present disclosure improves the problems of errors in recovery evaluation, gas breakthrough time prediction, and oil-gas migration laws caused by the existing injection-production optimization methods not considering the incomplete miscible displacement characteristics. According to the present disclosure, the mathematical method and the numerical simulation method are combined, and the injection mode, well pattern spacing and water alternating gas system in the reservoir development process are comprehensively optimized based on incomplete miscibility characteristics such as component front, phase front and pressure front laws in the process of low permeability reservoir development by carbon dioxide. On this basis, the parameters such as reservoir recovery, cumulative oil production and oil exchange ratio are considered, and the method of whole life cycle development and optimization of carbon dioxide injection based on incomplete miscibility characteristics is put forward for the first time, providing an important basis for the economy and rationality for designing the scheme of reservoir development by carbon dioxide injection.

BRIEF DESCRIPTION OF THE DRAWINGS

In order to explain the embodiments of the present disclosure or the technical solution in the prior art more clearly, the drawings needed in the embodiments will be briefly introduced below. Apparently, the drawings in the following description are only some embodiments of the present disclosure. For one of ordinary skill in the art, other drawings may be obtained according to these drawings without paying creative labor.

DETAILED DESCRIPTION OF THE EMBODIMENTS

In the following, the technical solutions in the embodiments of the present disclosure will be clearly and completely described with reference to the attached drawings. Apparently, the described embodiments are only a part of the embodiments of the present disclosure, but not all the embodiments. Based on the embodiments in the present disclosure, all other embodiments obtained by one of ordinary skill in the art without creative effort belong to the protection scope of the present disclosure.

In order to make the above objects, features and advantages of the present disclosure more obvious and easier to understand, the present disclosure will be further described in detail with the attached drawings and specific embodiments.

Embodiment 1

Figure 1:
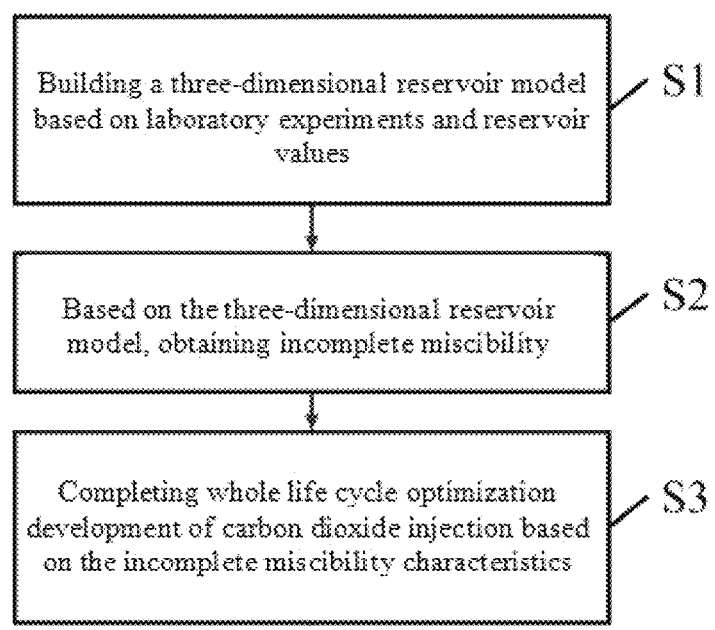
FIG. 1 is a schematic flow diagram of a method according to an embodiment of the present disclosure.
Figure 2A:
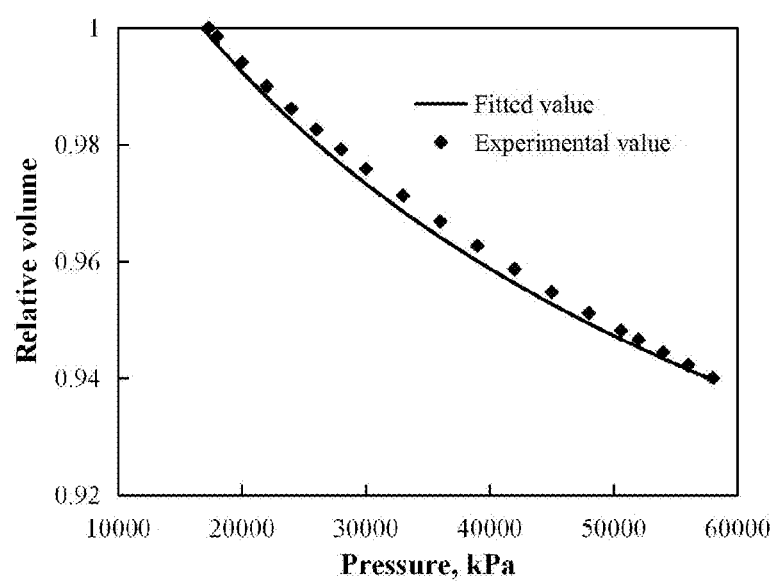
FIG. 2A is a schematic diagram of a relative volume fitting curve according to an embodiment of the present disclosure.
Figure 2B:
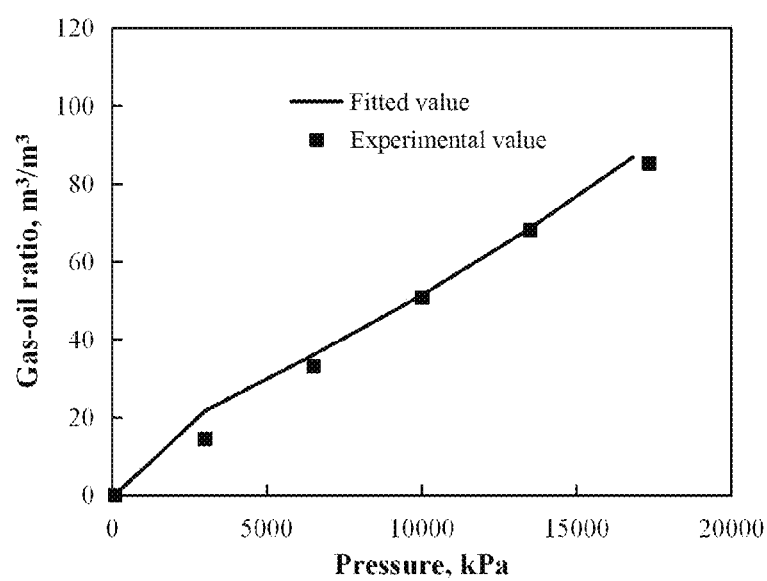
FIG. 2B is a schematic diagram of a gas-oil ratio fitting curve according to an embodiment of the present disclosure.
Figure 2C:
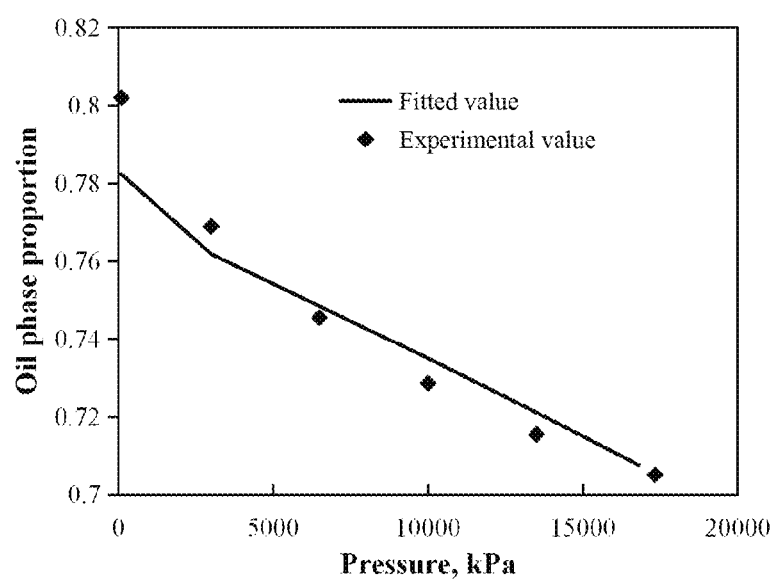
FIG. 2C is a schematic diagram of an oil phase proportion fitting curve according to an embodiment of the present disclosure.
Figure 2D:
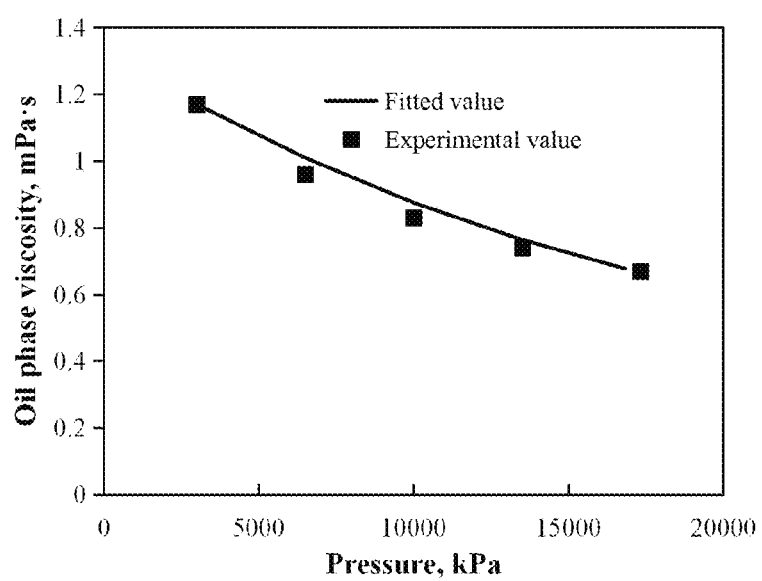
FIG. 2D is a schematic diagram of a fitting curve of oil phase viscosity according to an embodiment of the present disclosure.

A schematic diagram of the method flow of this embodiment is shown in FIG. 1, and the steps include:

S1. based on laboratory experiments and reservoir values, a three-dimensional reservoir model is built.

In this embodiment, the three-dimensional reservoir model includes a fluid model and a reservoir model, where the method of building the fluid model includes: based on laboratory experiments, analyzing and obtaining the fluid components of formation crude oil; based on the fluid components of formation crude oil, defining adjustable variables, where the adjustable variables include: component interaction coefficient, molar mass of $C_{30+}$ and crude oil viscosity; and based on the adjustable variables, fitting the experimental data of numerical simulation and physical simulation, and outputting the fluid model when the simulation accuracy is greater than 95%.

Specifically, as one of the implementations, the steps include:

opening the Wionprop module in the numerical simulation software computer modelling group (CMG) to create a basic fluid model, opening "Component Selection/Properties", selecting fluid components from the component library to create a component table according to the component data obtained from the experiment, and then opening "Composition" to input the crude oil composition and the molar fraction of injected fluid; opening the menu bar Calculations-Saturation Pressure, and inputting the fluid saturation pressure of 17.33 megapascal (MPa) and the experimental temperature of 126.7° C.; opening the Lab in the menu bar, inputting three experimental data of laboratory experiments (constant composition expansion experiment, multi-stage degassing experiment and gas injection expansion experiment) into the table, and clicking Run to get the basic fluid model.

After importing the data to create the basic fluid model, the experiments that need to be fitted are added to the "Regression Parameter" one by one to form a tree diagram, in which the adjustable variables are defined, and HcInt-CoeExp-1 is selected as the interaction coefficient, and the parameters such as temperature, pressure and volume of $C_{30+}$ are all set as adjustable variables, and the viscosity is calculated by Pedersen model; the coefficients and exponents of all JST viscosity correlations are selected in Viscosity Parameters, Run is clicked to start the operation, and then the results are output in Simulation Results. As shown in FIG. 2A-FIG. 2D, the accuracy of each variable reaches more than 95% of requirement, and the fitting effect is good, which may provide fluid model guarantee for the next simulation; the GEM fluid model is output, component in the Builder module in CMG is opened, the output GEM fluid model is imported, and the numerical simulation of formation fluid is completed.

A reservoir model is established based on reservoir numerical simulation, and reservoir parameters are set after the reservoir model building is completed; reservoir parameters include: reservoir depth, temperature, reservoir pressure, reservoir porosity, reservoir permeability, reservoir oil saturation, reservoir temperature gradient, reservoir pressure coefficient and reservoir saturation pressure.

Figure 3:
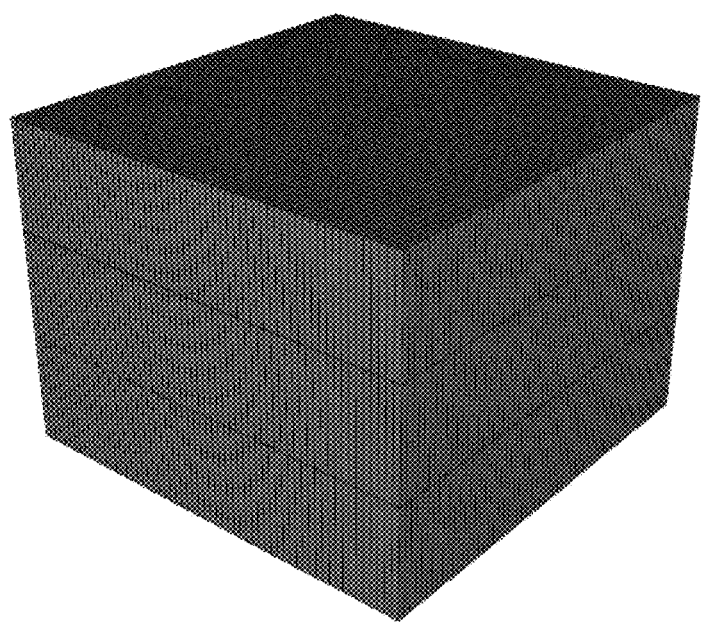
FIG. 3 is a schematic diagram of a reservoir model according to an embodiment of the present disclosure.
Figure 4A:
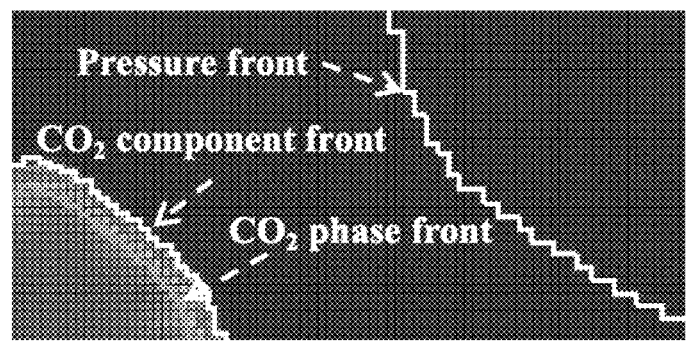
FIG. 4A is a schematic diagram of front migration in an early stage of injection according to an embodiment of the present disclosure.
Figure 4B:
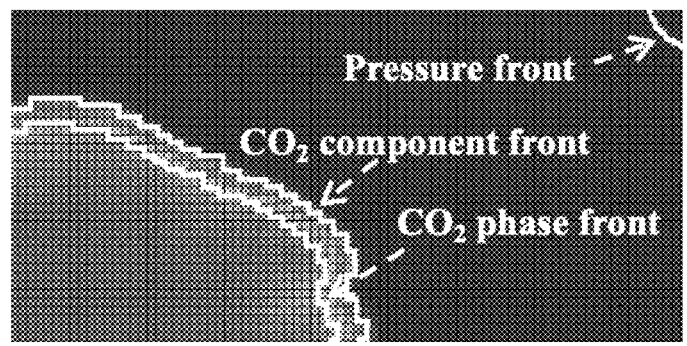
FIG. 4B is a schematic diagram of front migration of critical miscible displacement according to an embodiment of the present disclosure.
Figure 4C:
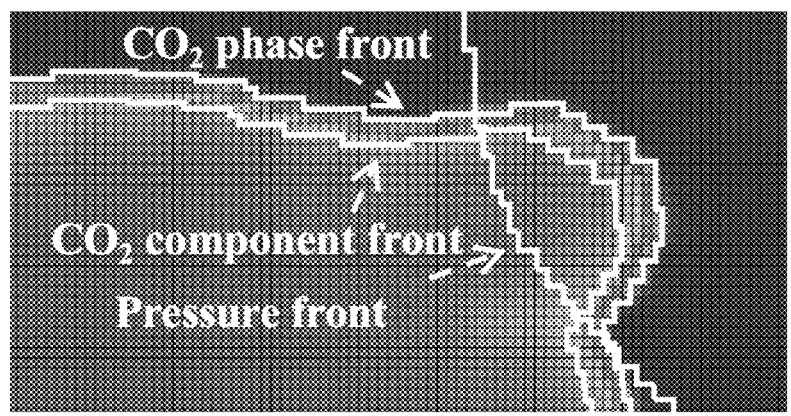
FIG. 4C is a schematic diagram of front migration in an incomplete miscible state according to an embodiment of the present disclosure.
Figure 5A:
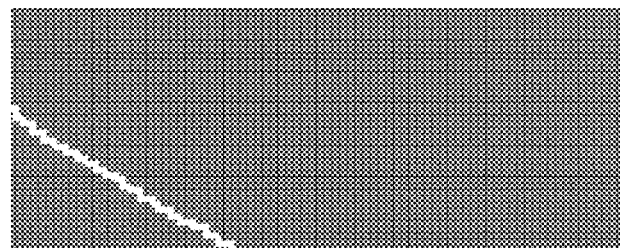
FIG. 5A is a crude oil viscosity distribution field diagram in an early stage of injection according to an embodiment of the present disclosure.
Figure 5B:
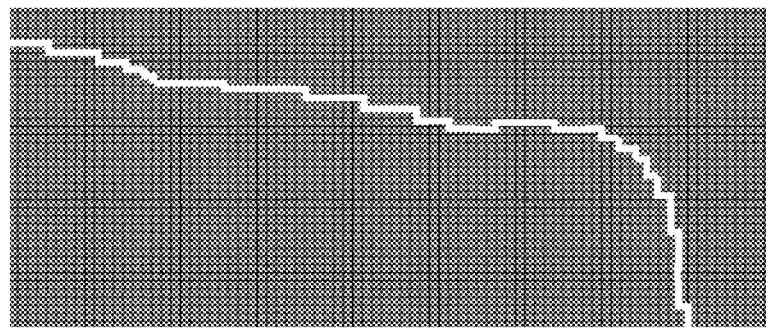
FIG. 5B is a crude oil viscosity distribution field diagram of critical miscible displacement according to an embodiment of the present disclosure.
Figure 5C:
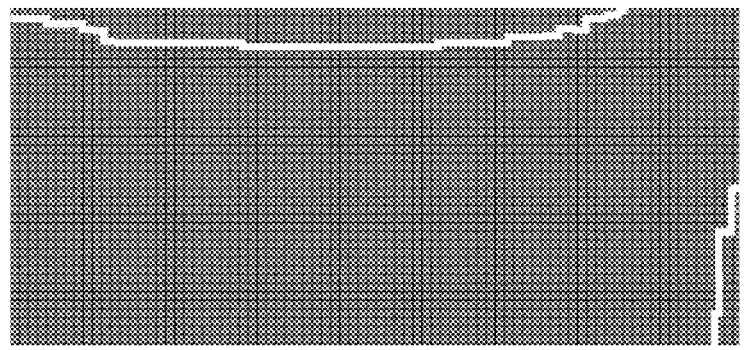
FIG. 5C is a crude oil viscosity distribution field diagram in an incomplete miscible state according to an embodiment of the present disclosure.
Figure 6A:
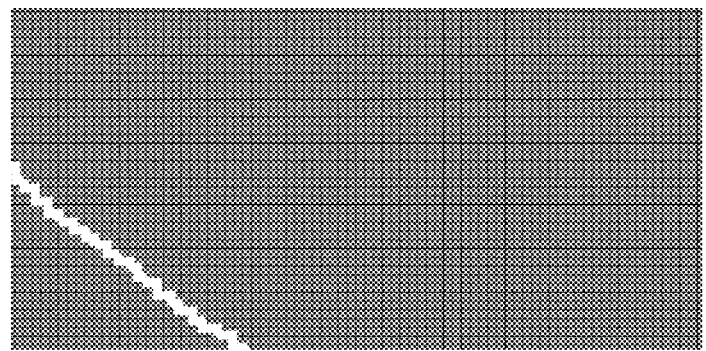
FIG. 6A is a crude oil density distribution field diagram in an early stage of injection according to an embodiment of the present disclosure.
Figure 6B:
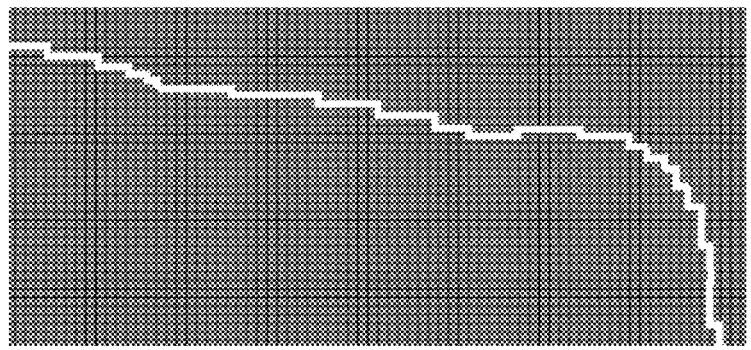
FIG. 6B is a crude oil density distribution field diagram of critical miscible displacement according to an embodiment of the present disclosure.
Figure 6C:
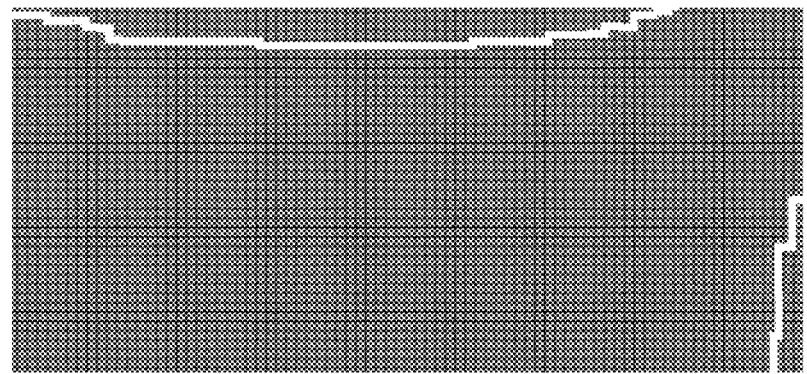
FIG. 6C is a crude oil density distribution field diagram in an incomplete miscible state according to an embodiment of the present disclosure.

Specifically, based on the GEM module of the reservoir numerical simulation software CMG, the number of grids is set to 20×20×3=1200, and each grid is 50 m×50 m, and each grid is 3×3 encrypted. The reservoir physical parameters are as follows: the reservoir depth is 3500 m, the reservoir temperature is 126° C., the initial reservoir pressure is 55.0 MPa, and the reservoir porosity is 13.9%, the reservoir permeability is 8 milliDarcy (mD), the reservoir oil saturation is 60%, and the viscosity of formation crude oil is 1.98 milliPascal per second (mPa·s). The density of ground degassed crude oil is 0.862 gram per cubic centimeter (g/cm$^3$). The volume coefficient of formation crude oil is 1.14, and the viscosity of formation crude oil is 0.44-1.25 mPa·s. The geothermal gradient of block temperature and pressure test is 3.76 degrees Celsius per hectometer (° C./hm), the pressure coefficient is 1.44, the original formation pressure is 55.0 MPa, and the reservoir saturation pressure is 17.3 MPa. The established three-dimensional reservoir model is shown in FIG. 3.

S2. Based on the three-dimensional reservoir model, the incomplete miscibility characteristics of reservoir development by carbon dioxide injection are obtained.

Based on the three-dimensional reservoir model, the simulation result diagram is obtained; based on the simulation result diagram, the key characterization parameters are calculated; based on the key characterization parameters, the incomplete miscibility characteristics are obtained. Among them, the key characterization parameters include: carbon dioxide component sweep coefficient, carbon dioxide phase sweep coefficient, miscibility degree, viscosity reduction index and density reduction index; and the incomplete miscibility characteristics in reservoir development by carbon dioxide injection are comprehensively judged by using these parameters. In this embodiment, the front end with carbon dioxide concentration of 0 is defined as the component front, and the area with carbon dioxide migrating and sweeping is defined as the component sweep area; the front end of a crude oil-carbon dioxide system with an interfacial tension of 0.001 millinewton per meter (mN·m$^{-1}$) is defined as the phase front, and the swept area is defined as the phase sweep area; the position with the formation pressure equal to the minimum miscible pressure of carbon dioxide and crude oil between injection-production wells is defined as the miscible pressure front; the area surrounded by the pressure front, the component front and the phase front is defined as the miscible area, and the swept range is the miscibility degree; the carbon dioxide component sweep coefficient is defined as the ratio of the swept volume of component front to the controlled volume of well pattern; the carbon dioxide phase sweep coefficient is defined as the ratio of the swept volume of phase front to the controlled volume of well pattern; the viscosity reduction index is defined as the degree of crude oil viscosity reduction in the area between the component front and the phase front; the density reduction index is defined as the degree of crude oil density reduction in the area between the component front and the phase front.

Specifically, based on the output results of the numerical simulation software CMG, the migration results of pressure front, carbon dioxide phase front and carbon dioxide component front, as well as the viscosity change and density change results of crude oil are obtained, as shown in FIG. 4A-FIG. 4C, FIG. 5A-FIG. 5C and FIG. 6A-FIG. 6C. The results show that with the depressurization of production wells, the miscible pressure front of the low permeability reservoir retreats. When the miscible pressure front intersects with the carbon dioxide component front, the range of the miscible zone begins to shrink. When the miscible pressure front is separated from the carbon dioxide phase front, the reservoir may not achieve miscibility. At this time, the sweep coefficient of the carbon dioxide phase front is miscibility degree. In the early stage of injection, the pressure front does not intersect with the component front, resulting in global miscibility. The pressure front contacts with the component front, reaching critical miscible displacement, and the pressure front migrates to the production well, reaching an incomplete miscible state.

Based on the component sweep, phase sweep degree and the percentage of miscible cells in the total cells in the three-dimensional reservoir model, the component sweep coefficient, phase sweep coefficient and miscibility degree, as well as the reduction degree of viscosity and density of crude oil in the process of carbon dioxide injection development may be obtained to calculate the viscosity reduction index and the density reduction index, and comprehensively characterize the incomplete miscible displacement characteristics of carbon dioxide in the reservoir, as shown in Table 1.

TABLE 1

| Phase sweep coefficient, % | Component sweep coefficient, % | Miscibility degree, % | Density reduction index | Viscosity reduction index |
| --- | --- | --- | --- | --- |
| 69 | 61 | 77 | 0.51 | 0.57 |

S3. Based on the incomplete miscibility characteristics, the whole life cycle optimization development of carbon dioxide injection is completed.

① Optimization of Injection Mode

According to the characteristic equation of injection capacity change, carbon dioxide continuous drive and carbon dioxide water alternating gas drive are compared.

$$I = \frac{Q_t}{|\Delta P|} = \frac{Q_t}{|P_i - P_r|},$$

where, I represents the injection capacity, unit: cubic meter per day per megapascal Substitute Specification-Clean (m$^3$/(d·MPa)); Qt represents the injection speed, unit: cubic meter per day (m$^3$·d$^{-1}$); Pr represents the original formation pressure, unit: MPa; Pi represents the injection pressure at any time, unit: MPa.

Figure 7:
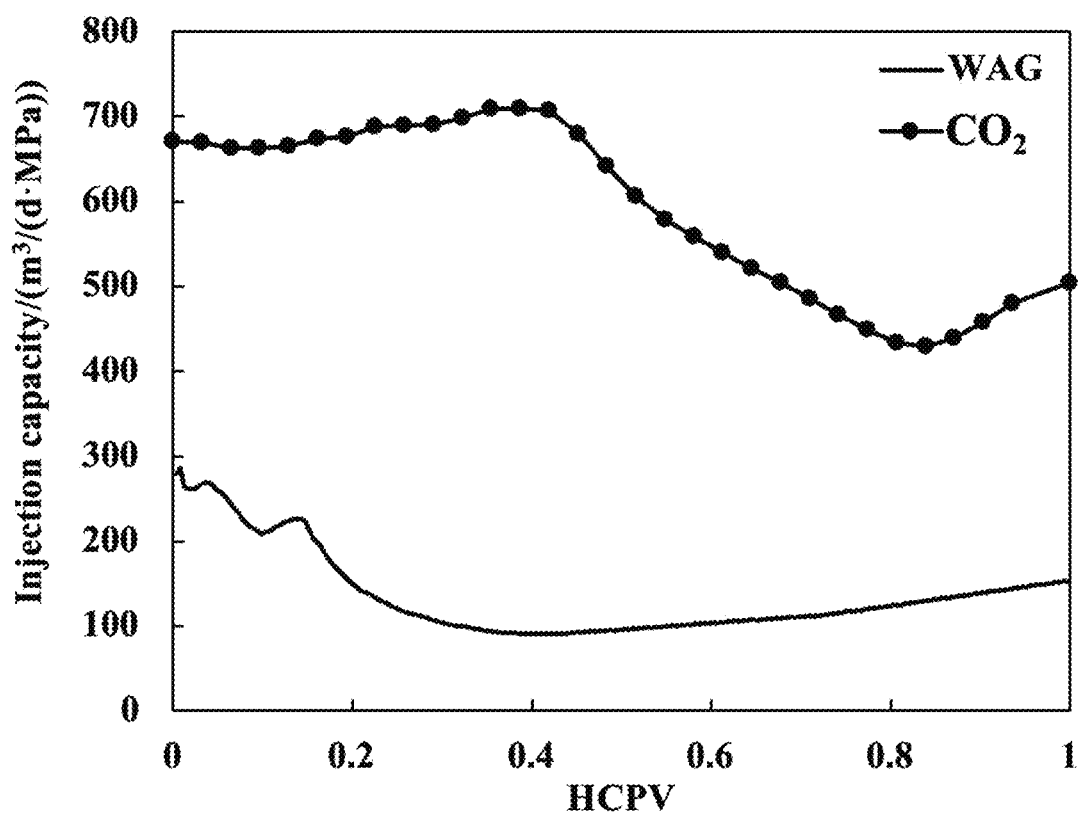
FIG. 7 is a comparison diagram of injection capacity of according to embodiment of the present disclosure.

The injection capacity is characterized by total water/gas injection rate, formation pressure and other parameters. As shown in FIG. 7, the injection capacity of carbon dioxide continuous gas drive is about three times that of carbon dioxide water alternating gas injection, so carbon dioxide continuous gas drive is selected for injection in the early stage of development.

② Well Spacing Optimization of Well Pattern

Well pattern optimization: based on numerical simulation software, the results of different well patterns are simulated, and the migration laws of miscible pressure front, phase front and component front in incomplete miscible displacement in operation results, as well as parameters such as reservoir recovery, cumulative oil production, oil exchange ratio and storage ratio, are analyzed, and the well pattern optimization of carbon dioxide injection development considering the incomplete miscible displacement characteristics is comprehensively formulated.

Figure 8A:
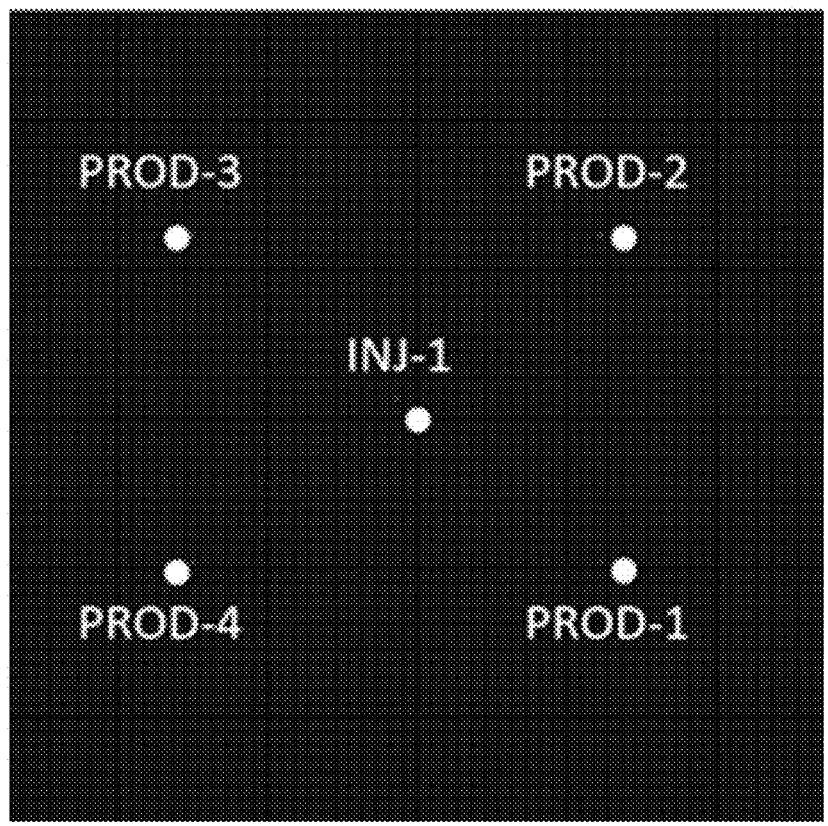
FIG. 8A is a schematic diagram of carbon dioxide drive of a five-spot well pattern in an embodiment of the present disclosure.
Figure 8B:
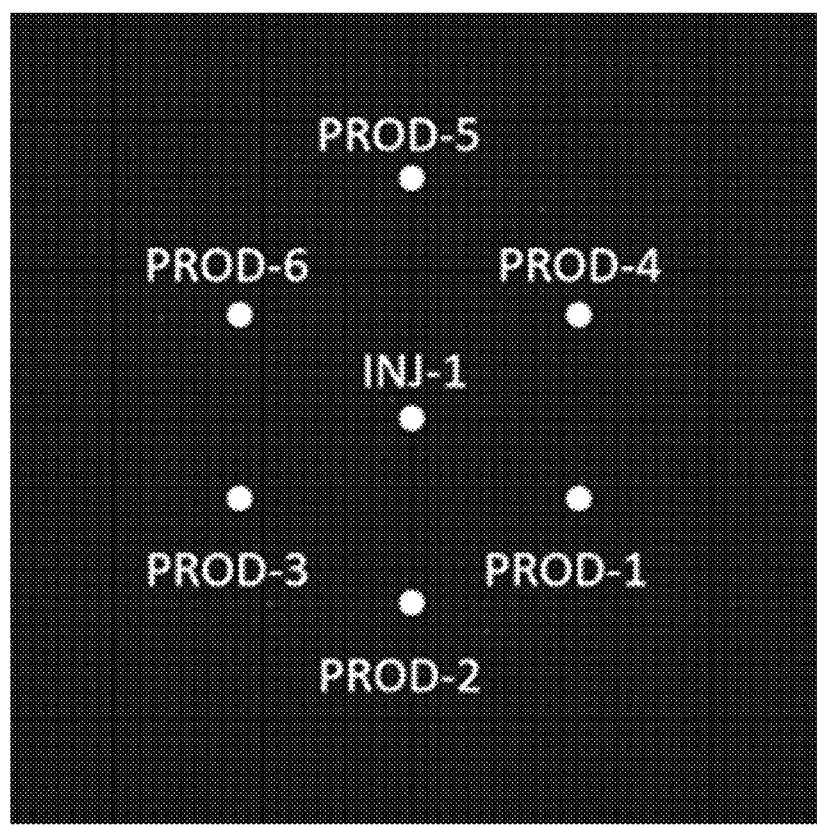
FIG. 8B is a schematic diagram of carbon dioxide drive of an inverted seven-spot well pattern in an embodiment of the present disclosure.
Figure 8C:
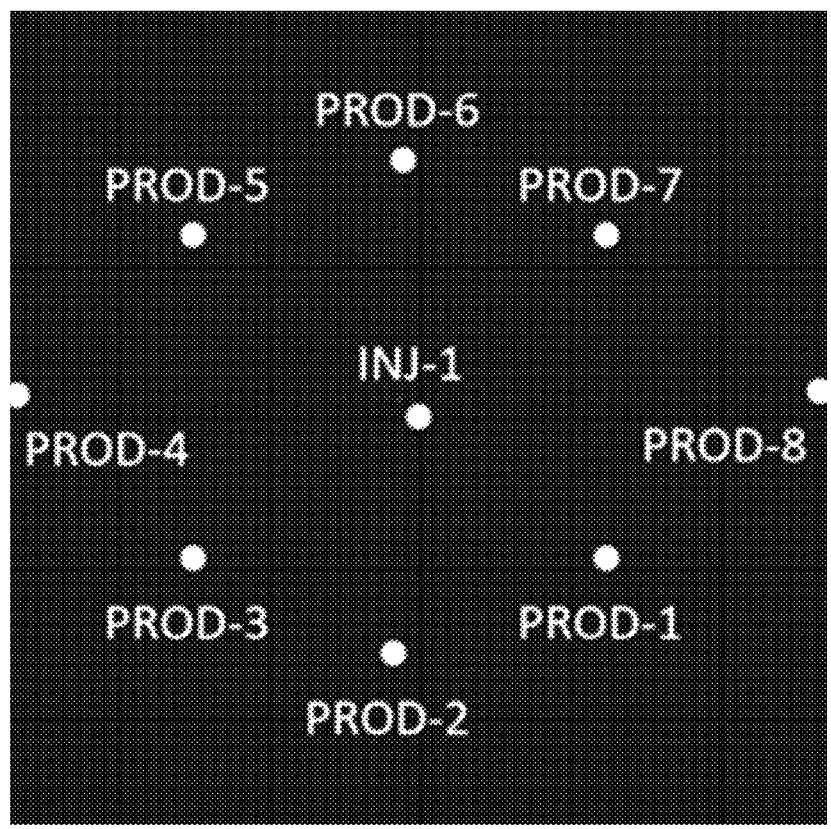
FIG. 8C is a schematic diagram of carbon dioxide drive of an inverted nine-spot well pattern in an embodiment of the present disclosure.

Specifically, based on the established homogeneous model, the type of carbon dioxide drive well pattern is optimized, and three common regular well pattern conditions, namely, five-spot well pattern, inverted seven-spot well pattern and inverted nine-spot well pattern, are respectively considered, and one injection well is set in each of the three well pattern conditions, and the production wells are 4, 6, and 8 wells as shown in FIG. 8A-FIG. 8C. The model adopts the production system of constant carbon dioxide injection quantity, injection pressure and production pressure, and sets the single well carbon dioxide injection quantity as 100,000 cubic meter per day ($m^3$/d), injection pressure as 57.0 MPa, production pressure as 18.0 MPa and production duration as 30 years.

Figure 9A:
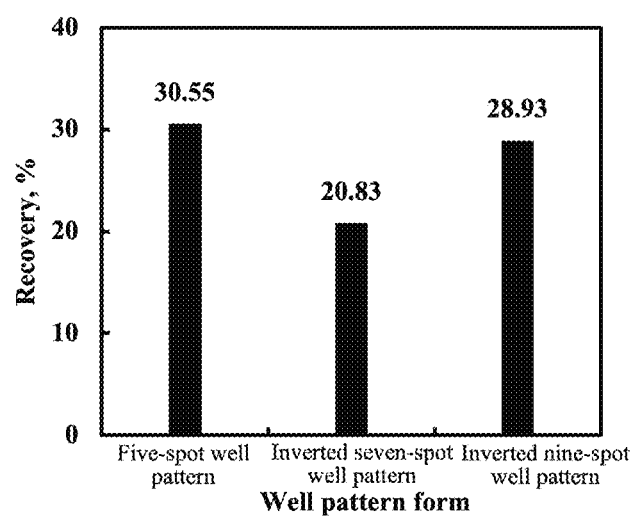
FIG. 9A is a comparison of reservoir recovery of carbon dioxide drive of different well patterns in an embodiment of the present disclosure.
Figure 9B:
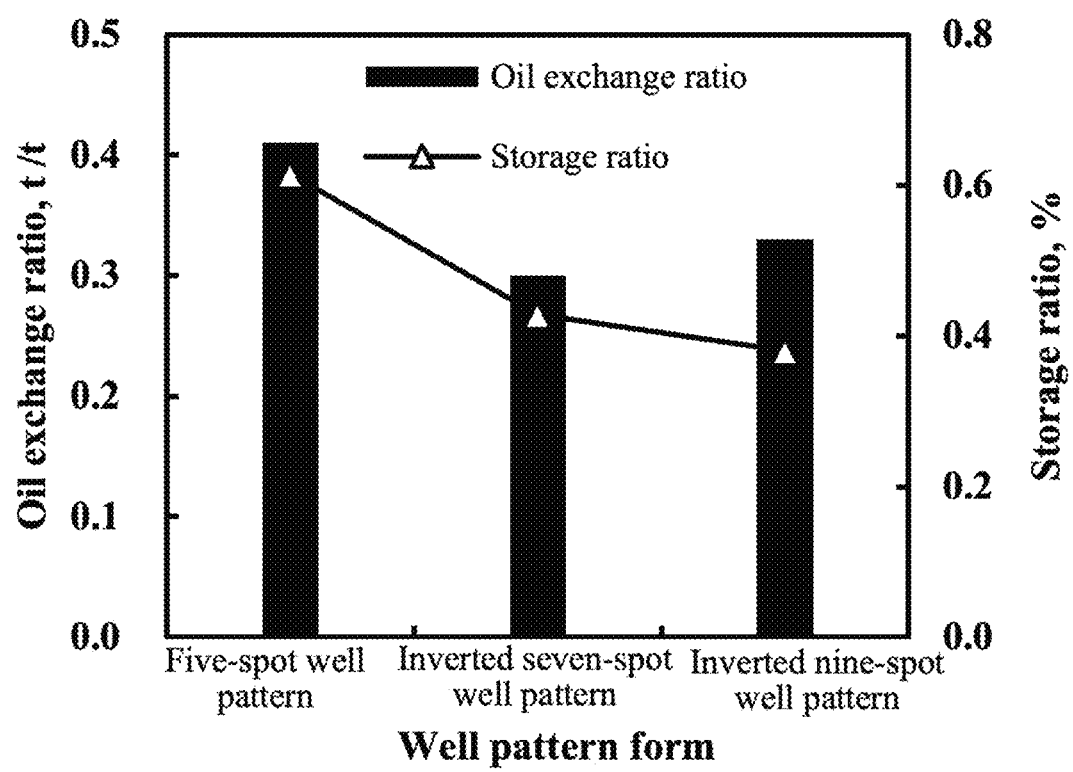
FIG. 9B is a comparison of oil exchange ratio and storage ratio of carbon dioxide drive of different well patterns in an embodiment of the present disclosure.

As shown in FIG. 9A-FIG. 9B, by analyzing the curves of oil production, gas production and gas injection rate in the numerical simulation results under different well patterns, comparing the reservoir recovery, oil exchange ratio and storage ratio under different well patterns, and by comprehensively considering the crude oil production, the economic economy of crude oil development and the social benefits of carbon dioxide storage, the five-spot well pattern is preliminarily recommended.

Figure 10A:
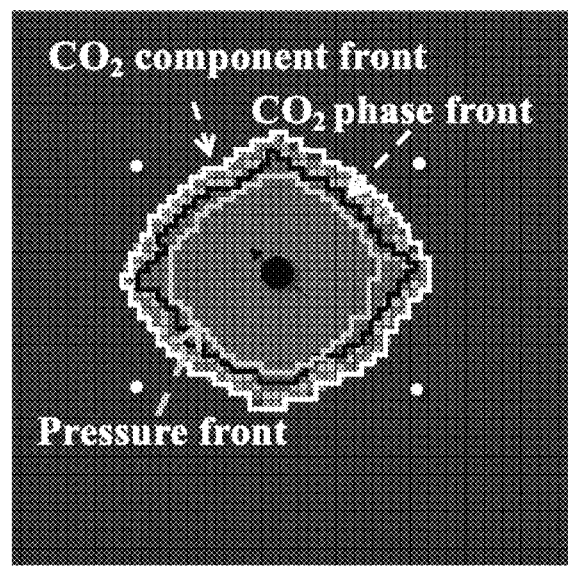
FIG. 10A is a diagram of three kinds of front migration of a five-spot well pattern with 0.23 pore volume (PV) according to an embodiment of the present disclosure.
Figure 10B:
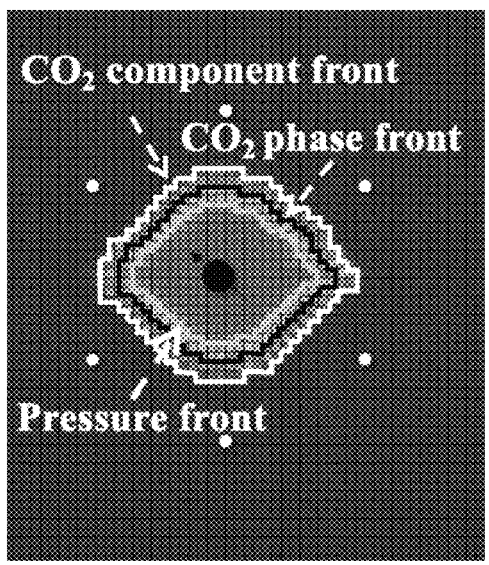
FIG. 10B is a diagram of three kinds of front migration of an inverted seven-spot well pattern, with 0.17 PV according to an embodiment of the present disclosure.
Figure 10C:
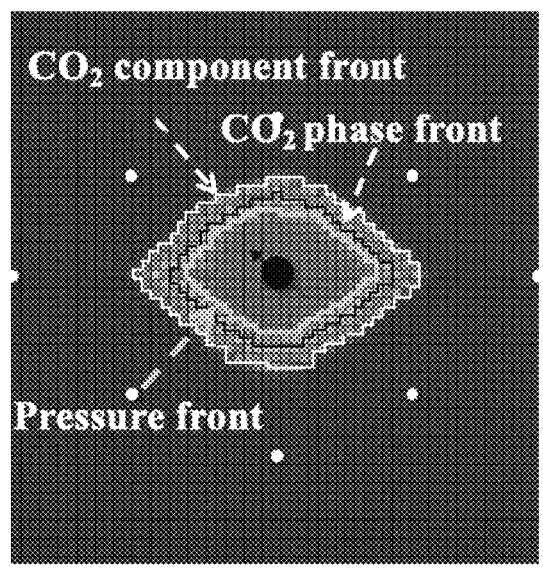
FIG. 10C is a diagram of three kinds of front migration of an inverted nine-spot well pattern, with 0.16 PV according to an embodiment of the present disclosure.

As shown in FIG. 10A-FIG. 10C, based on the Aerial View plane display interface in CMG software, and based on different field diagrams (pressure field diagram, carbon dioxide concentration field diagram and oil-gas interface tension field diagram), when the pressure front contacts with the component front, that is, the reservoir begins to be in an incomplete miscible state, three kinds of front migration laws are obtained and analyzed. The analysis shows that the injection-production direction of the five-spot well pattern is perpendicular to the fracturing direction, the ratio of injection-production wells is the largest, and the gas injection requirement of single well for pressure-maintaining production is the smallest. Moreover, compared with the seven-spot well pattern and the inverted nine-spot well pattern, the five-spot well pattern has the slowest regression of the miscible pressure front, the largest sweep coefficient (increased by 6-10%) and the highest miscibility degree (increased by 8-10%).

Considering the recovery, oil exchange ratio, storage ratio and the incomplete miscible displacement characteristics based on three kinds of front migration laws comprehensively, the final optimization result is to adopt five-spot well pattern for development.

Well spacing optimization: when the pressure front contacts with the component front, that is, the reservoir begins to be in an incomplete miscible state, three kinds of front migration laws are obtained, the front migration laws are analyzed, the regression speed of the miscible pressure front, carbon dioxide sweep coefficient and miscibility degree are judged, and the characteristic data of the maximum limit well spacing and the oil recovery rate well spacing are comprehensively considered for the well spacing optimization based on the incomplete miscible displacement characteristics of carbon dioxide.

Figure 11A:
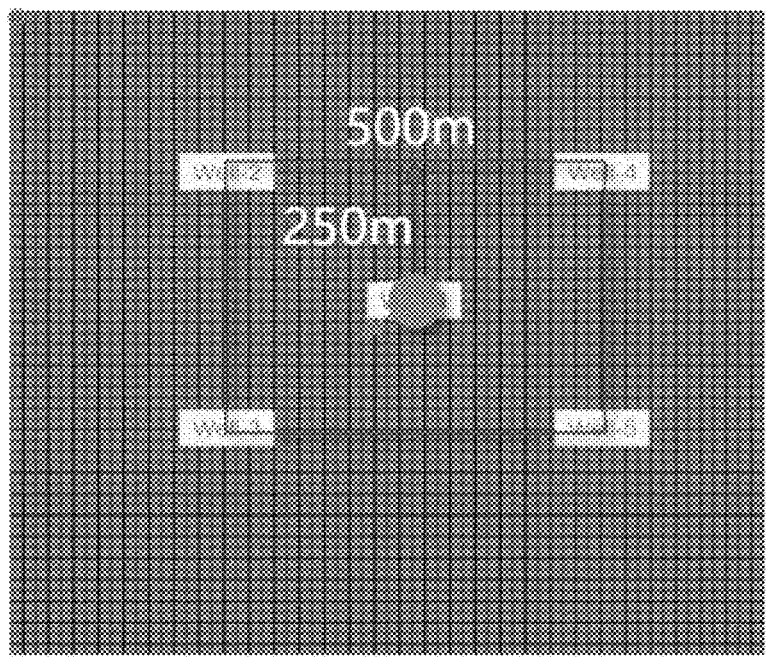
FIG. 11A shows a 500 meters (m)×250 m well spacing pattern of carbon dioxide flooding according to an embodiment of the present disclosure.
Figure 11B:
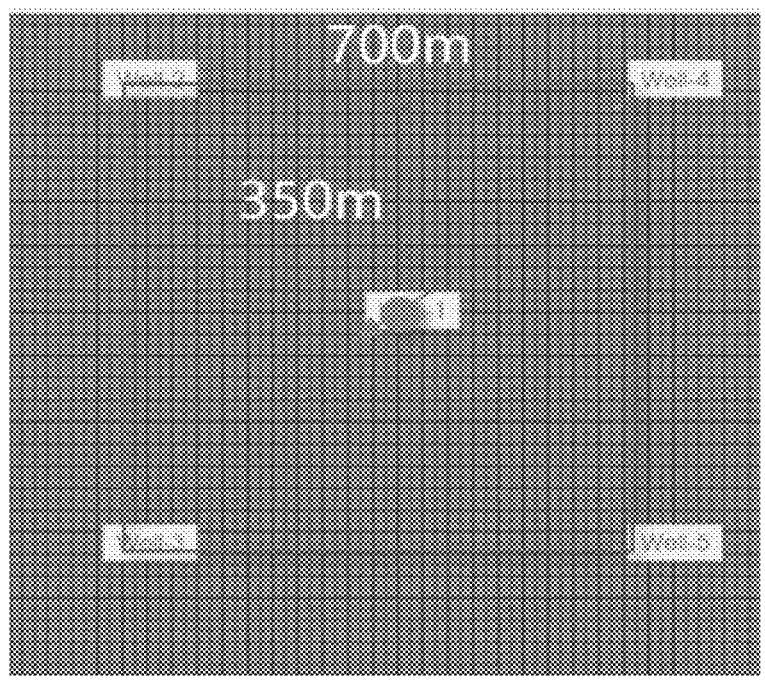
FIG. 11B shows a 700 m×350 m well spacing pattern of carbon dioxide flooding according to an embodiment of the present disclosure.

Specifically, as shown in FIG. 11A-FIG. 11B, the well spacing type of carbon dioxide drive is optimized based on the established three-dimensional reservoir model, and two well spacing conditions of 500 m×250 m and 700 m×350 m are considered respectively, both with a five-spot well pattern. The model adopts the production system of constant carbon dioxide injection quantity, injection pressure and production pressure, and sets the single well carbon dioxide injection quantity as 100,000 $m^3$/d, injection pressure as 57.0 MPa, production pressure as 18.0 MPa and production duration as 30 years.

Figure 12A:
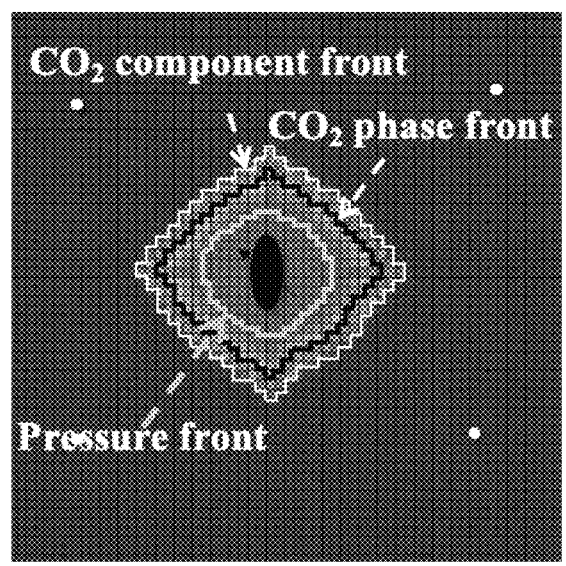
FIG. 12A is a diagram of three kinds of front migration for 500 m×250 m well spacing according to an embodiment of the present disclosure.
Figure 12B:
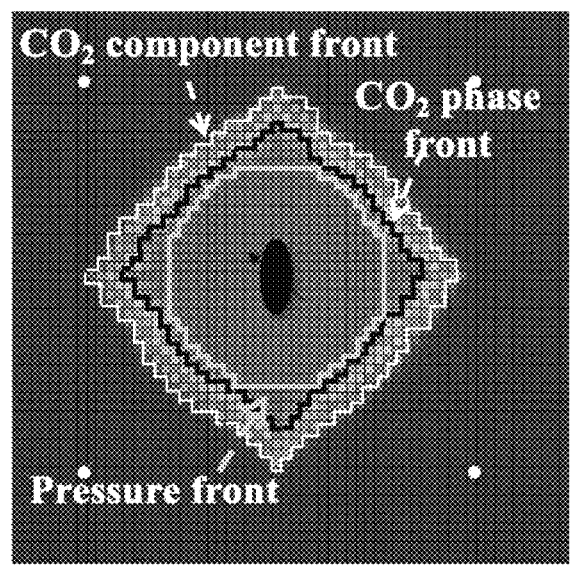
FIG. 12B is a diagram of three kinds of front migration for 700 m×350 m well spacing according to an embodiment of the present disclosure.

As shown in FIG. 12A and FIG. 12B and Table 2, the GEM module based on CMG carries out simulation operation, and the finished sr3 result file opens the Aerial View plane display interface in the result file through the Result module. Based on the reservoir pressure field diagram, carbon dioxide concentration field diagram and oil-gas interface tension field diagram, the results show that with the increase of injection-production well spacing from 500 m×250 m to 700 m×350 m, the sweep range of component front and phase front decreases by 6%, the miscibility degree of carbon dioxide-crude oil system decreases by 9%, the degree of crude oil density reduction decreases by 4.7%, and the degree of crude oil viscosity reduction decreases by 4.5%, which are not conducive to improving the crude oil development effect of carbon dioxide drive. Therefore, the well spacing of 500 m×250 m should be selected for actual development.

TABLE 2

| Well pattern | Component sweep coefficient, % | Phase sweep coefficient, % | Miscibility degree, % | Density reduction index | Viscosity reduction index |
| --- | --- | --- | --- | --- | --- |
| 500 × 250 m | 86 | 84 | 74 | 0.89 | 0.92 |
| 700 × 350 m | 79 | 77 | 65 | 0.85 | 0.88 |

③ Optimization of Water Alternating Gas System

When the carbon dioxide component front in the three-dimensional reservoir model migrates to the production wells, it is considered that there is a risk of carbon dioxide gas channeling, and the carbon dioxide gas channeling is suppressed by the water alternating gas system. The reasonable water-gas slug ratio is preliminarily calculated. Based on the numerical simulation software, different water alternating gas systems with different slug ratios and different slug sizes, etc., are carried out, three kinds of frontier migration laws, the parameters such as oil exchange ratio, recovery and gas-oil ratio of production wells in the operation results are analyzed, and the gas channeling suppression effect is comprehensively judged, so that the water alternating gas system is optimized based on the incomplete miscible displacement characteristics of carbon dioxide.

Specifically, based on the ideas of stabilizing formation pressure, limiting gas slug injection time and underground water-gas density, the following formulas are established to determine the reasonable interval of water-gas slug ratio, and the calculation method of water alternating gas system injection slug ratio is established, and the water-gas slug ratio is calculated to be 1-1.5.

Formula for expanding swept volume and improving flooding efficiency:

$$\begin{cases} r_{wgs} \geq \dfrac{E_{Vw}}{E_{Vg}} \\ r_{wgs} \leq \dfrac{r_{ipws}}{r_{ipgs}} \dfrac{1}{(r_{ipws}-1)} \end{cases},$$

where $r_{wgs}$ represents the volume ratio of underground water-gas slug, unit: dimensionless; $Ev_w$ represents the plane sweep coefficient of water in a single plug, unit: dimensionless; $Ev_g$ represents the plane sweep coefficient of gas in a single plug, unit: dimensionless; $r_{ipws}$ represents the water drive injection-production ratio during water slug injection, unit: dimensionless; $r_{ipgs}$ represents the gas drive injection-production ratio during gas slug injection, unit: dimensionless.

Time relation of gas injection and water injection:

$$r_{wgs} = \dfrac{\rho_g q_{inw} T_w}{\rho_w q_{ing} T_g},$$

where $\rho_g$ represents the underground density of the injected gas, unit: kilogram per cubic meter (kg·m⁻³); $\rho_w$ represents the underground density of water phase, unit: kg·m⁻³; $q_{inw}$ represents the mass of water injected into the reservoir every day, unit: kg; qing represents the mass of gas injected into the reservoir every day, unit: kilogram (kg); $T_w$ represents the water slug injection time in a single cycle, unit: day (d); $T_g$ represents the gas slug injection time in a single cycle, unit: d.

Formula for maintaining the peak period of effectiveness of gas breakthrough:

$$\begin{cases} \dfrac{n_o F_{gw} q_{ow0} T_w}{0.01 N_o} \Delta P_{wdd} \leq \Delta P_{wsd} \\ R_{Vgs} = \dfrac{365 n_o F_{gw} q_{ow0}}{N_{oi}} \end{cases},$$

where $n_0$ represents the number of oil wells, unit: wells; $F_{gw}$ represents the gas drive stimulation multiple, unit: dimensionless; $q_{ow0}$ represents the single well production before gas injection, unit: ton per day (t/d); $N_0$ represents the geological reserves at the beginning of gas injection, unit: ton (t); $\Delta P_{wdd}$ represents the allowable formation pressure drop during water slug injection in a single WAG period, unit: MPa; $\Delta P_{wsd}$ represents the formation pressure drop caused by unit recovery degree during water injection, unit: MPa; $Rv_{gs}$ represents the oil recovery rate of the gas injection layer during the peak period of gas drive effectiveness, unit: dimensionless.

Formula for preventing free gas from continuously channeling:

$$T_{btg} < \dfrac{2L_{sl}}{300} T_{gsl} = 1.333 K_{ar}^{-0.336} L_{sl},$$

where, $T_{btg}$ represents the time taken for free gas phase breakthrough after gas breakthrough takes effect, unit: d; $L_{sl}$ represents the length of the main pipe, unit: m;

$T_{gsi}$ represents the time taken for gas to flow through a given distance, unit: second(s).

The reasonable interval of water-gas slug ratio is:

$$\begin{cases} \dfrac{E_{Vw}}{E_{vg}} \leq r_{wgs} \leq \dfrac{r_{ipws}}{r_{ipgs}} \dfrac{1}{(r_{ipws}-1)} \\ T_w \leq \dfrac{3.65}{R_{Vgs}} \dfrac{\Delta P_{wsd}}{\Delta P_{wdd}} \\ T_{btg} < \dfrac{2L_{sl}}{300} \dfrac{\varphi_{sl} \mu_g L_{sl} K_a^{-0.8}}{c_{kt}^{0.8}(3.5 S_g - 0.5) gradP} \\ T_g = \dfrac{1}{r_{wgs}} \dfrac{\rho_g q_{inw} T_w}{\rho_w q_{ing}} \end{cases},$$

where, φsl represents the average porosity of the main pipe, unit: dimensionless; Ug represents the continuous gas phase viscosity, unit: Pascal second; gradP represents the injection-production pressure gradient, unit: Pascal per meter (Pa·m⁻¹); Sg represents average gas saturation, unit: dimensionless; Ckt represents the heterogeneity coefficient of the main pipe, unit: dimensionless.

Figure 13:
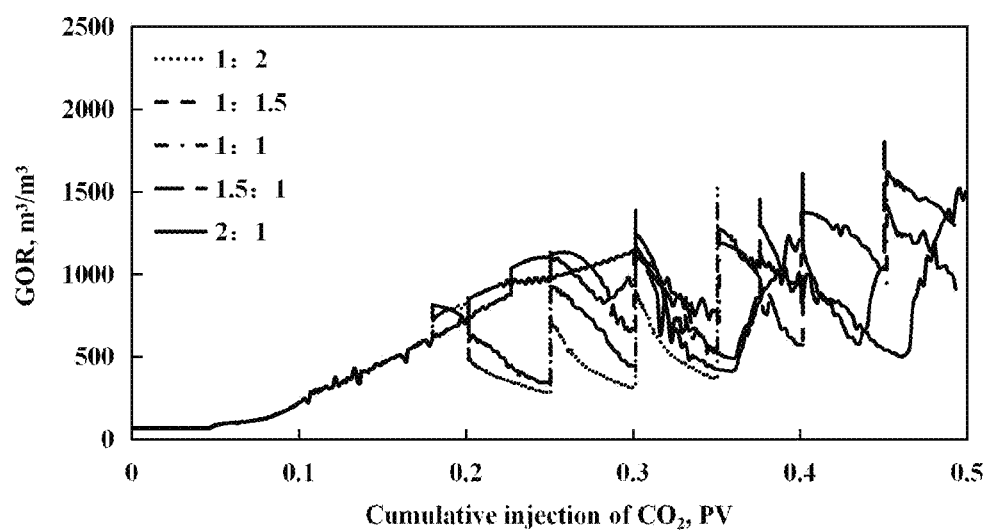
FIG. 13 shows gas-oil ratio under different slug ratios according to an embodiment of the present disclosure.
Figure 14:
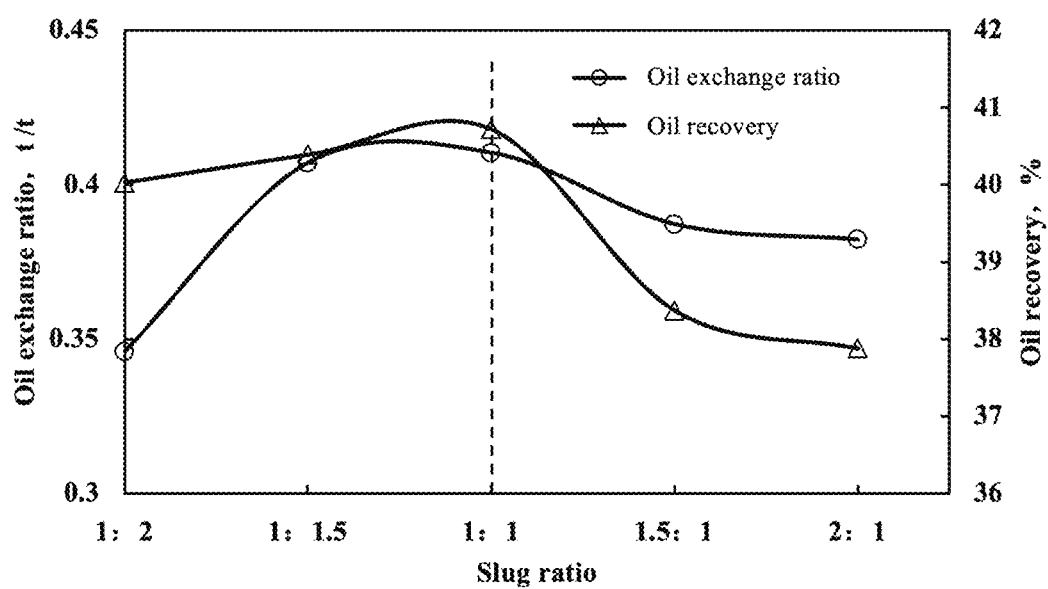
FIG. 14 shows oil exchange ratio and recovery under different slug ratios according to an embodiment of the present disclosure.

As shown in FIG. 13 and FIG. 14, by using the running results of numerical simulation software, comparing the development effects of water-gas slug ratios of 1:1, 1:1.5, 1:2, 1.5:1 and 2:1, respectively, and considering the comprehensive recovery and oil exchange ratio, the water-gas slug ratio of 1:1 is recommended.

Figure 15:
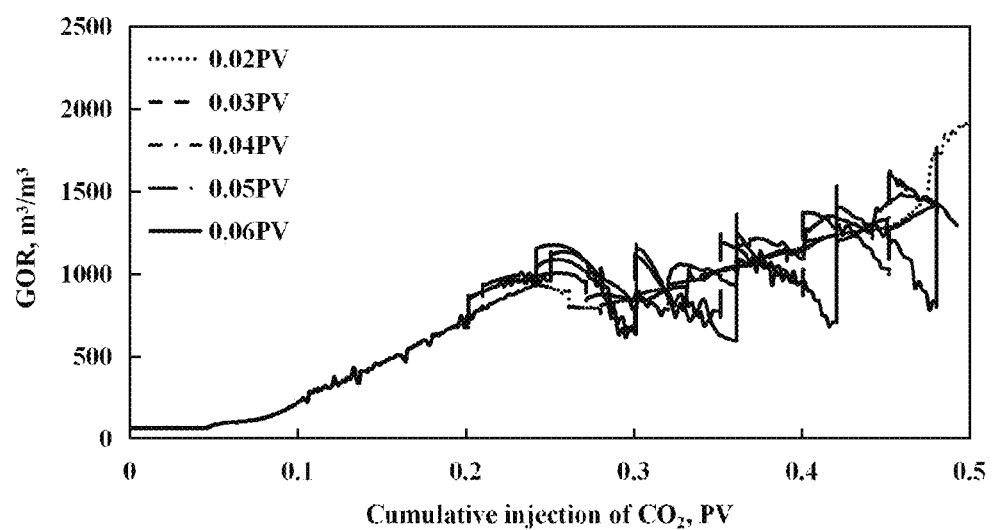
FIG. 15 shows gas-oil ratio under different slug sizes according to an embodiment of the present disclosure.
Figure 16:
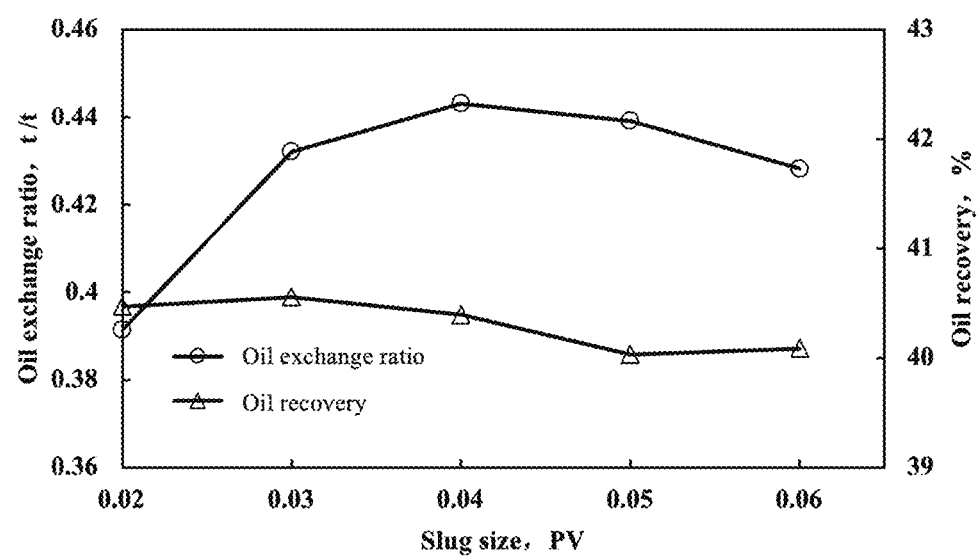
FIG. 16 shows oil exchange ratio and recovery under different slug sizes according to an embodiment of the present disclosure.

As shown in FIG. 15 and FIG. 16, based on the optimized slug ratio of 1:1, by using the running results of numerical simulation software, comparing the effects of slug sizes of 0.01, 0.02, 0.03, 0.04 and 0.05 hydrocarbon pore volume (HCPV), and considering the comprehensive oil exchange ratio and recovery, the recommended slug size is 0.04 HCPV.

Embodiment 2

The present disclosure also provides an optimization system for development by carbon dioxide injection based on incomplete miscibility characteristics, including a building module, a calculation module and an optimization module; the building module is used for building a three-dimensional reservoir model based on laboratory experiments and reservoir values; the three-dimensional reservoir model includes: fluid model and reservoir model; the calculation module is used for obtaining the incomplete miscibility characteristics of reservoir development by carbon dioxide injection based on the three-dimensional reservoir model; and the optimization module is used for completing the whole life cycle optimization and development of carbon dioxide injection based on incomplete miscibility characteristics.

The workflow of the building module includes: analyzing and obtaining the fluid components of formation crude oil based on laboratory experiments; based on the fluid components of formation crude oil, defining the adjustable variables, where the adjustable variables include: component interaction coefficient, molar mass of $C_{30+}$ and crude oil viscosity; based on adjustable variables, fitting the experimental data of numerical simulation and physical simulation, and outputting the fluid model when the simulation accuracy is greater than 95%.

The workflow of the building module also includes: building a reservoir model based on reservoir numerical simulation, and setting reservoir parameters after the reservoir model is built; reservoir parameters include: reservoir depth, temperature, reservoir pressure, reservoir porosity, reservoir permeability, reservoir oil saturation, reservoir temperature gradient, reservoir pressure coefficient and reservoir saturation pressure.

The above-mentioned embodiments only describe the preferred mode of the present disclosure, and do not limit the scope of the present disclosure. Under the premise of not departing from the design spirit of the present disclosure, various modifications and improvements made by ordinary technicians in the field to the technical solution of the present disclosure should fall within the protection scope of the present disclosure.

What is claimed is:

1. An optimization method for development by carbon dioxide injection based on incomplete miscibility characteristics, comprising the following steps:
building a three-dimensional reservoir model based on laboratory experiments and reservoir values, wherein the three-dimensional reservoir model comprises: a fluid model and a reservoir model;
based on the three-dimensional reservoir model, obtaining incomplete miscibility characteristics of reservoir development by carbon dioxide injection; wherein obtaining the incomplete miscible characteristics comprises the following steps: obtaining a simulation result diagram based on the three-dimensional reservoir model; calculating key characterization parameters based on the simulation result diagram; and based on the key characterization parameters, obtaining the incomplete miscibility characteristics; wherein the key characterization parameters comprise: carbon dioxide component sweep coefficient, carbon dioxide phase sweep coefficient, miscibility degree, viscosity reduction index and density reduction index; using these parameters to judge the incomplete miscibility characteristics of the reservoir development by carbon dioxide injection; defining a front end with a carbon dioxide concentration of 0 as a component front, and an area with carbon dioxide migrating and sweeping as a component sweep area; defining a front end of a crude oil-carbon dioxide system with an interfacial tension of 0.001 $mN \cdot m^{-1}$ as a phase front, and a swept area as a phase sweep area; defining a position with a formation pressure equal to a minimum miscible pressure of carbon dioxide and crude oil between injection-production wells as a miscible pressure front; defining an area surrounded by a pressure front, the component front and the phase front as a miscible area, wherein a swept range is the miscibility degree; defining the carbon dioxide component sweep coefficient as a ratio of a swept volume of the component front to a controlled volume of a well pattern; defining the carbon dioxide phase sweep coefficient as a ratio of a swept volume of the phase front to the controlled volume of the well pattern; defining the viscosity reduction index as a degree of crude oil viscosity reduction in an area between the component front and the phase front; defining the density reduction index as a degree of crude oil density reduction in the area between the component front and the phase front; and
completing whole life cycle optimization development of carbon dioxide injection based on the incomplete miscibility characteristics; wherein completing the whole life cycle optimization development of carbon dioxide injection comprises: injection mode optimization, well pattern spacing optimization and water alternating gas system optimization; wherein,
well pattern optimization comprises: performing result simulation of different well patterns based on a numerical simulation software, analyzing migration laws of the miscible pressure front, the phase front and the component front in incomplete miscible displacement in operation results, as well as reservoir recovery, cumulative oil production, oil exchange ratio and storage ratio, and formulating the well pattern optimization for the carbon dioxide injection development considering incomplete miscible displacement characteristics.

2. The optimization method for the development by the carbon dioxide injection based on the incomplete miscibility characteristics according to claim 1, wherein a method for building the fluid model comprises:
based on the laboratory experiments, analyzing and obtaining fluid components of formation crude oil;
defining adjustable variables based on the fluid components of the formation crude oil, wherein the adjustable variables comprise component interaction coefficient, molar mass of $C_{30+}$ and crude oil viscosity; and
fitting experimental data of numerical simulation and physical simulation based on the adjustable variables, and outputting the fluid model when a simulation accuracy is greater than 95%.

3. The optimization method for the development by the carbon dioxide injection based on the incomplete miscibility characteristics according to claim 1, wherein the reservoir model is built based on reservoir numerical simulation, and reservoir parameters are set after the reservoir model is built; and the reservoir parameters comprise: reservoir depth, temperature, reservoir pressure, reservoir porosity, reservoir permeability, reservoir oil saturation, reservoir temperature gradient, reservoir pressure coefficient and reservoir saturation pressure.

4. An optimization system for development by carbon dioxide injection based on incomplete miscibility characteristics, wherein the system is used for realizing the method according to claim 1, comprising: a building module, a calculation module and an optimization module;
wherein the building module is used for building the three-dimensional reservoir model based on the laboratory experiments and the oil reservoir values, wherein the three-dimensional reservoir model comprises: the fluid model and the reservoir model;
wherein the calculation module is used for obtaining the incomplete miscibility characteristics of the reservoir development by carbon dioxide injection based on the three-dimensional reservoir model; wherein obtaining the incomplete miscible characteristics comprises: obtaining the simulation result diagram based on the three-dimensional reservoir model; calculating the key characterization parameters based on the simulation result diagram; and based on the key characterization parameters, obtaining the incomplete miscibility characteristics; wherein the key characterization parameters comprise: the carbon dioxide component sweep coefficient, the carbon dioxide phase sweep coefficient, the miscibility degree, the viscosity reduction index and the density reduction index; using these parameters to judge the incomplete miscibility characteristics of the reservoir development by carbon dioxide injection; defining the front end with the carbon dioxide concentration of 0 as the component front, and the area with the carbon dioxide migrating and sweeping as the component sweep area; defining the front end of the crude oil-carbon dioxide system with the interfacial tension of 0.001 $mN \cdot m^{-1}$ as the phase front, and the swept area as the phase sweep area; defining the position with the formation pressure equal to the minimum miscible pressure of carbon dioxide and crude oil between the injection-production wells as the miscible pressure front; defining the area surrounded by the pressure front, the component front and the phase front as the miscible area, wherein the swept range is the miscibility degree; defining the carbon dioxide component sweep coefficient as the ratio of the swept volume of the component front to the controlled volume of the well pattern; defining the carbon dioxide phase sweep coefficient as the ratio of the swept volume of the phase front to the controlled volume of the well pattern; defining the viscosity reduction index as the degree of crude oil viscosity reduction in the area between the component front and the phase front; defining the density reduction index as the degree of crude oil density reduction in the area between the component front and the phase front;

wherein the optimization module is used for completing the whole life cycle optimization development of carbon dioxide injection based on the incomplete miscibility characteristics; and the method for completing the whole life cycle optimization development of carbon dioxide injection comprises: the injection mode optimization, the well pattern spacing optimization and the water alternating gas system optimization.

5. The optimization system for the development by the carbon dioxide injection based on the incomplete miscibility characteristics according to claim 4, wherein a workflow of the building module comprises:

based on the laboratory experiments, analyzing and obtaining fluid components of formation crude oil;

defining adjustable variables based on the fluid components of the formation crude oil, wherein the adjustable variables comprise component interaction coefficient, molar mass of $C_{30+}$ and crude oil viscosity; and fitting experimental data of numerical simulation and physical simulation based on the adjustable variables, and outputting the fluid model when a simulation accuracy is greater than 95%.

6. The optimization system for the development by the carbon dioxide injection based on the incomplete miscibility characteristics according to claim 5, wherein a workflow of the building module further comprises: building the reservoir model based on reservoir numerical simulation, and setting reservoir parameters after the reservoir model is built, wherein the reservoir parameters comprise: reservoir depth, temperature, reservoir pressure, reservoir porosity, reservoir permeability, reservoir oil saturation, reservoir temperature gradient, reservoir pressure coefficient and reservoir saturation pressure.

* * * * *